United States Patent [19]
Gau et al.

[11] Patent Number: 5,855,259
[45] Date of Patent: Jan. 5, 1999

[54] VISCOUS FLUID MOUNT

[75] Inventors: Jin Shy Gau; Jeffry D. Cotton, both of Akron, Ohio

[73] Assignee: BTR Antivibration Systems, Inc., Fort Wayne, Ind.

[21] Appl. No.: 889,947

[22] Filed: Jul. 10, 1997

Related U.S. Application Data

[62] Division of Ser. No. 512,504, Aug. 8, 1995, abandoned.

[51] Int. Cl.⁶ ...................................................... F16F 9/04
[52] U.S. Cl. .................... 188/298; 188/320; 188/322.22; 267/140.13; 267/140.14
[58] Field of Search ...................................... 188/298, 317, 188/320, 322.15, 322.22; 267/219, 140.13, 140.14, 141

[56] References Cited

U.S. PATENT DOCUMENTS

| | | |
|---|---|---|
| 2,852,108 | 9/1958 | Ranson . |
| 3,132,725 | 5/1964 | Zeidler . |
| 3,747,914 | 7/1973 | Thrasher . |
| 4,383,679 | 5/1983 | Kakimoto ...................... 267/140.13 X |
| 4,576,366 | 3/1986 | Gallas et al. . |
| 4,610,438 | 9/1986 | Eberhard et al. . |
| 4,679,779 | 7/1987 | Hodonski . |
| 4,733,758 | 3/1988 | Duclos et al. . |
| 4,800,965 | 1/1989 | Keller . |
| 4,852,533 | 8/1989 | Doncker et al. . |
| 4,893,800 | 1/1990 | Tabata . |
| 4,925,162 | 5/1990 | Kojima . |
| 4,928,935 | 5/1990 | Matsui ................................ 267/140.13 |
| 5,009,403 | 4/1991 | Kato et al. . |
| 5,028,039 | 7/1991 | Sato . |
| 5,052,662 | 10/1991 | Doi ..................................... 267/140.14 |
| 5,070,971 | 12/1991 | Dourson et al. . |
| 5,161,653 | 11/1992 | Hare, Sr. . |
| 5,464,196 | 11/1995 | Dankowski . |

*Primary Examiner*—Lee W. Young
*Attorney, Agent, or Firm*—Wood, Herron & Evans, L.L.P.

[57] ABSTRACT

Briefly, according to this invention there is provided a viscous fluid mount for interconnection between a vibrating body and a base. The viscous fluid mount includes a chamber, a high viscosity damping fluid contained within the chamber and a flow resistance device. Input energy from the vibrating body is dissipated by shear friction of the damping fluid moving parallel to the shear surface area of the flow resistance device.

17 Claims, 6 Drawing Sheets

VISCOUS FLUID MOUNT

This application is a divisional of application Ser. No. 08/512,504, filed on Aug. 8, 1995, now abandoned.

FIELD OF THE INVENTION

This invention relates to a viscous fluid mount. More particularly, this invention relates to a viscous fluid mount having a controlled level of storage stiffness and viscous damping.

BACKGROUND OF THE INVENTION

Fluid mounts are typically utilized on vehicles to damp out vibrations from a vibrating body in instances where the vibrations cannot be reduced sufficiently with conventional rubber mounts. Although the many known types of fluid mounts have been proven to perform satisfactorily, further improvements associated with fluid mount design and construction are desired. For example, heretofore known fluid mounts are capable of only damping out vibrations using high loss stiffness (damping) K" over a narrow range around their resonant frequency. Furthermore, it will be appreciated that above the resonant frequency of heretofore known fluid mounts the storage stiffness (elastic) K' increases significantly. This undesirable high storage stiffness (elastic) K' causes large vibrations in the vehicle in the high frequency region (30 to 300 Hz).

In addition to the problem of large vibrations in the high frequency region, manufacturing costs of heretofore known fluid mounts are also undesirably high because of the need to assemble the fluid mounts while the fluid mounts are immersed in fluid to avoid trapping air bubbles in the fluid mounts. It will be appreciated that trapped air in a fluid mount adversely affects the performance of the fluid mount.

It is an object of the present invention to provide a fluid mount capable of using a high viscous fluid and providing high loss stiffness (damping) K" over a wide frequency range. Another object of the present invention is to provide a viscous fluid mount of a design capable of controlling the magnitude of storage stiffness (elastic) K'. Yet another object of the present invention is to provide a viscous fluid mount wherein the properties of the elastomer material forming the mount have less of an effect on the performance of the fluid mount than typically experienced. Still another object of the present invention is to provide a viscous fluid mount that is not limited to applications for reducing vibrations of rigid body resonances of engine systems, e.g., <25 Hz. Another object of the present invention is to provide a viscous fluid mount that is simple and economical to manufacture.

SUMMARY OF THE INVENTION

Briefly, according to this invention there is provided a viscous fluid mount for interconnection between a vibrating body and a base. The viscous fluid mount includes a chamber, a high viscosity damping fluid contained within the chamber and a flow resistance device. The chamber is defined by an elastomeric housing having opposing cover brackets. One of the cover brackets is operatively connected to the vibrating body and the remaining cover bracket is operatively connected to the base. The flow resistance device is positioned within the chamber and is operatively connected to one of the cover brackets. The shear stress surface area of the flow resistance device is greater than the normal stress surface area such that input energy from the vibrating body is dissipated by shear friction of the damping fluid moving parallel to the shear surface area.

BRIEF DESCRIPTION OF THE DRAWINGS

Further features and other objects and advantages of this invention will become clear from the following detailed description made with reference to the drawings in which.

DETAILED DESCRIPTION OF THE PREFERRED EMBODIMENTS

In the description of the figures, like reference characters designate like or corresponding parts. Also in the following description it is understood that such terms as "top", "bottom", "upper" and "lower" and the like, are terms of convenience and are not to be construed as limiting terms apart from the invention as claimed.

Referring now to the drawings, there is shown a viscous fluid mount 10 whose damping force may be varied as a function of the dynamic movement of a vibrating body (not shown), such as an internal combustion engine. The viscous mount 10 includes an elastomeric housing 12 interposed between an upper cover bracket 14 which is rigidly operably connected to the vibrating body, e.g., engine, and a lower cover bracket 16 which is rigidly operably connected to a base (not shown), e.g., chassis of a vehicle. It will be appreciated that although the invention is primarily described and illustrated as an engine viscous mount, it will be apparent to one skilled in the art once the invention is disclosed and explained that the viscous mount 10 may be used with equal facility in other applications. For example, the viscous mount 10 may also be used as a suspension bushing and therefore the description of the same in relation to an engine mount is not to be construed as a limitation on the scope of the invention.

The elastomeric housing 12 of the viscous mount 10 is generally of a cylindrical shape having a bore 18 extending the longitudinal length of the cylinder to define a top open end 20 and a bottom open end 22. The elastomeric housing 12 may be formed of most any suitable elastomeric material that stretches under tension, has a high tensile strength, retracts rapidly and fully recovers to the original dimensions of the housing. Examples of elastomeric materials include natural or synthetic rubber and the like. In a preferred embodiment, the elastomeric material has a durometer of about 40 to 70 Shore A, and most preferably about 60 Shore A.

Secured to the top open end 20 and the bottom open end 22 of the housing 12 are the upper cover bracket 14 and the lower cover bracket 16. The upper cover bracket 14 and the lower cover bracket 16 in cooperation with annular rings 24 provide a fluid tight seal to the housing 12 to define a fluid chamber containing a high viscosity damping fluid 26. The upper cover bracket 14 and the lower cover bracket 16 are of a size and shape to suit the operating environment of the viscous mount 10 and may be formed from most any suitable durable material such as steel and the like.

As shown in the figures, the upper cover bracket 14 and the lower cover bracket 16 include a circular base plate 28 and a boss 30 such as a projecting cylindrical shape member. Holes 32 are spaced about the circumference of the base plate 28 to receive fasteners 34 to secure the brackets 14 and 16 in position as further described herein. The base plate 28 has external diameter greater than the external diameter of the housing 12 and the external diameter of the boss 30 is approximately equal to the internal diameter of the housing. The annular rings 24 are formed of a durable material such as metal and the like that may be tightened around the circumference of the housing 12 to clamp the housing against the boss 30 and form a fluid tight seal.

The damping fluid 26 contained within the elastomeric housing 12 is a Newtonian type fluid having a high viscosity between 70,000 and 120,000 centipoise at ambient temperature, preferably 100,000 centipoise. The damping fluid may be any suitable high viscosity fluid such as silicone oil, grease, liquid crystal polymer and the like as long as the high viscosity fluid is compatible with the elastomeric materials.

A flow resistance device 36 is positioned within the elastomeric housing 12 and is operatively connected to at least one of the brackets 14 and 16. The flow resistance device 36 of the viscous mount 10 includes a plurality fluid passages 38. An important feature of the present invention is that the fluid passages 38 of the flow resistance device 36 have a shear stress surface area 40 substantially greater than the normal stress surface area 42 for increased shear damping efficiency. It will be appreciated that the shear stress surface area 40 of the fluid passages 38 of the flow resistance device is greater than the normal stress surface area 42 such that input energy from the vibrating body is dissipated by the synergistic effect of the high tensile strength of the elastomeric housing 12 and the shear friction of the damping fluid against the shear stress surface area of the fluid passages 38. For effective shear dampening it has been found that the shear stress surface area 40 of the flow resistance device must be at least approximately 100 times greater than the normal stress surface area 42 of the flow resistance device, and preferably at least 500 times greater than the normal stress surface area.

Figure 1:
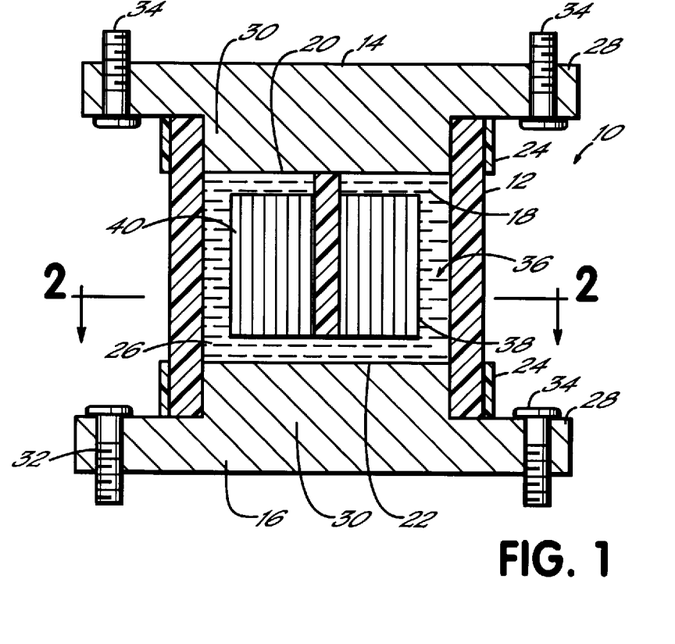
FIG. 1 is a sectional view showing the construction of an embodiment of the present invention.
Figure 2:
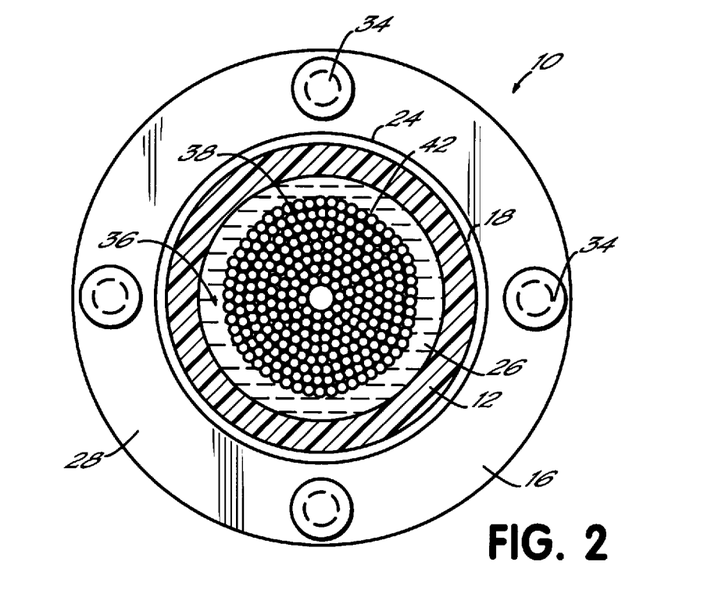
FIG. 2 is a cross-sectional view of FIG. 1 taken along line 2—2.
Figure 4:
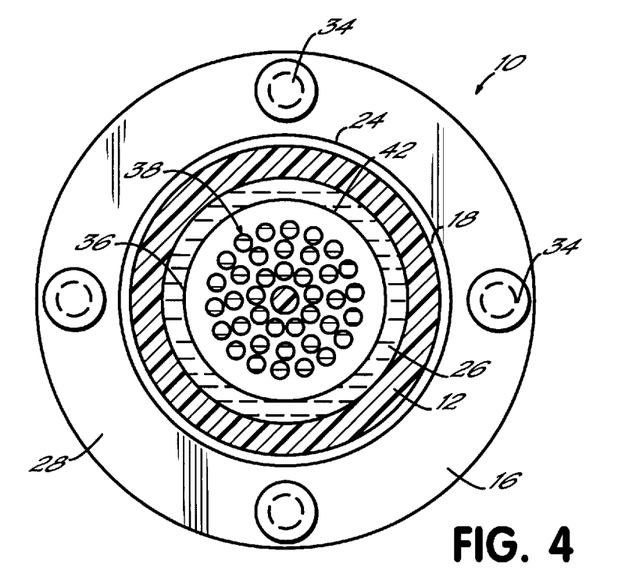
FIG. 4 is a cross-sectional view of FIG. 3 taken along line 4—4.
Figure 6:
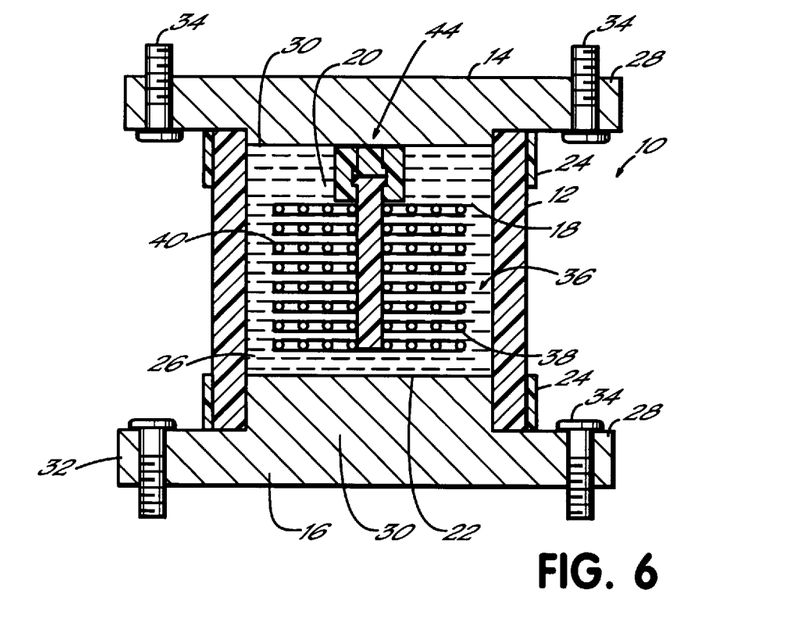
FIG. 6 is a sectional view showing the construction of yet another embodiment of the present invention.
Figure 8:
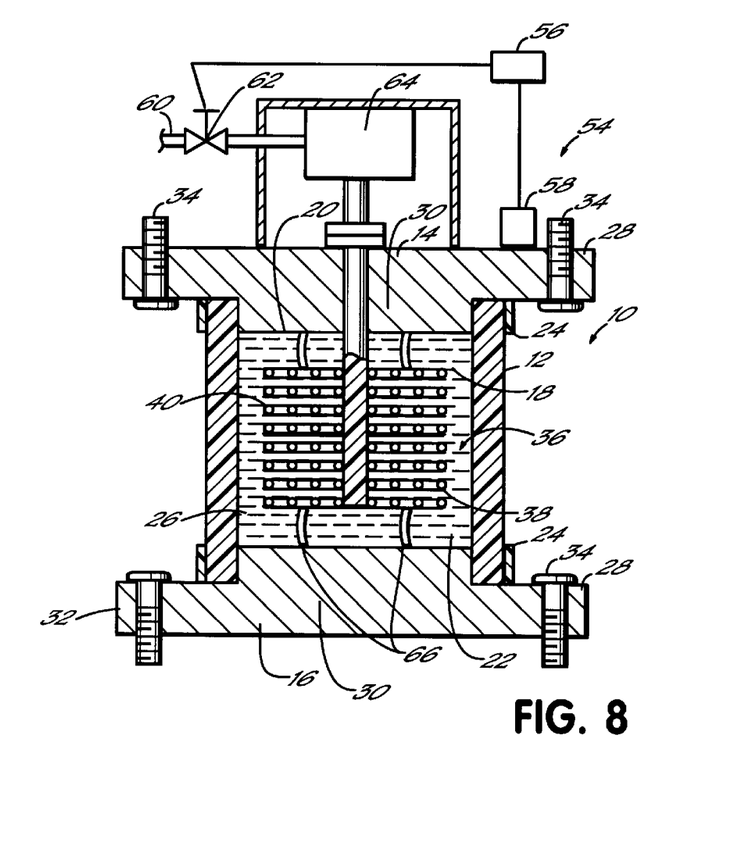
FIG. 8 is a sectional view showing the construction of another embodiment of the present invention.

The fluid passages 38 may comprise a plurality of cylindrical tubes (FIG. 1) or a plurality of stacked plates (FIGS. 4, 6 and 8). In a preferred embodiment, the fluid passages have axially aligned openings therein. The quantity and size of the tubes, plates and openings may vary depending upon the intended application of the viscous mount 10 and the amount of shear dampening required. As shown in FIGS. 1 and 2, the cylindrical tubes are arranged parallel to one another and are attached to adjacent contiguous tubes to form a bundle of tubes. The tubes are approximately 1.5 inches in length and 0.25 inches in diameter. The external diameter of the tube bundle is less than the internal diameter of the elastomeric housing 12 to allow the damping fluid 26 to flow around the tubes. Similarly, the plates contain a plurality of selectively arranged openings formed therein of approximately 0.2 to 0.3 inches in diameter. The external diameter of each plate is also less than the internal diameter of the elastomeric housing 12 to allow the damping fluid 26 to flow around the plates. In a preferred embodiment, the outer diameter of the fluid passages 38 is approximately 0.25 inches less than the internal diameter of the elastomeric housing 12.

Figure 3:
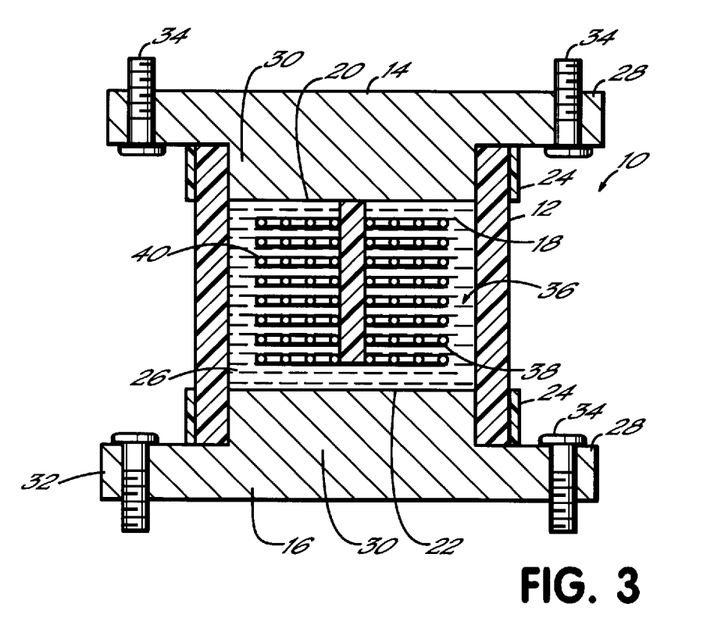
FIG. 3 is a sectional view showing the construction of another embodiment of the present invention.

As shown in FIGS. 1 and 3, the flow resistance device 36 is operatively connected to the upper cover bracket 14 such that under a dynamic load from the vibrating body the dynamic load will be transmitted to the top bracket and to the elastomeric housing 12. The elastomeric housing 12, having a constant volume, deforms from the dynamic load thereby changing the geometry of the chamber. The deformation in the geometry of the chamber in turn causes the damping fluid 26 to flow through the fluid passages 38 of the flow resistance device 36 such that the dynamic force is dissipated by the synergistic effect of the elastomeric housing and by the shear stress of the damping fluid over the surface area of the flow resistance device 36.

Figure 5:
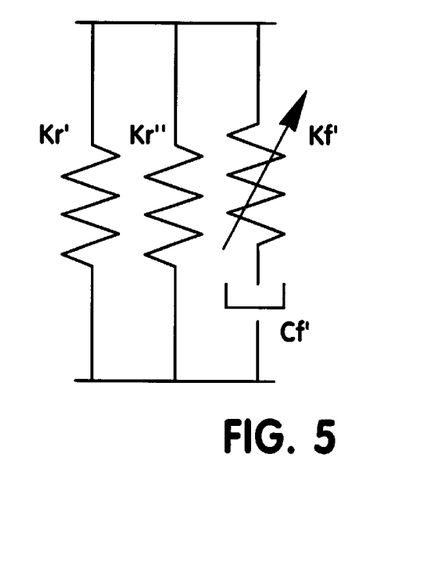
FIG. 5 is a model illustrating the conceptual arrangement of the invention shown in FIGS. 1–4.

The viscous fluid mount 10 of FIGS. 1 and 3 can be essentially represented by the model as shown in FIG. 5. The model consists of an elastomer member, e.g., housing 12, and a flow resistance device 36 including a damping fluid 26. The housing 12 is represented by a storage stiffness $K'_r$ in parallel to a loss stiffness $K''_r$ that dissipates energy in terms of structure damping. The flow resistance device 36 is represented by a storage stiffness $K'_f$ in series with a viscous damper $C_f$ that dissipates energy in terms of viscous damping. The storage stiffness $K'_f$ is a function of the dynamic fluid pressure that is induced by the damping fluid 26 moving against the large cross sectional area of the walls of the flow resistance device 36 or by the high frequency oscillation of the damping fluid. A high viscous damper $C_f$ can be generated by a highly viscous damping fluid 26 moving through the large shear interfacial area between the fluid and tubes or high frequency oscillation of the fluid.

Referring to FIG. 6, yet another embodiment of a viscous fluid mount 10 in accordance with the present invention is shown. The viscous mount 10 of FIG. 6 displays acceptable performance at both low (7 to 20 Hz) and high (20 to 300 Hz) frequency ranges. The viscous mount 10 is similar to the viscous mount of FIG. 3 except that the viscous mount includes a displacement control device 44. The displacement control device 44 controls high damping by varying displacement, motion and frequency of the viscous mount 10 using internal feedback. The displacement control device 44 includes a cylinder 46 having an opening 48 extending the longitudinal length of the cylinder and a cavity 50 intermediate the length of the opening. The diameter of the cavity 50 is greater than the diameter of the opening 48. A disk 52, attached to the flow resistance device 36, is freely positioned within the cavity 50 such that after sufficient dynamic loading of the upper cover bracket 14 the cylinder 46 compresses for large dynamic loads causing the disk and flow resistance device to move axially.

Figure 7:
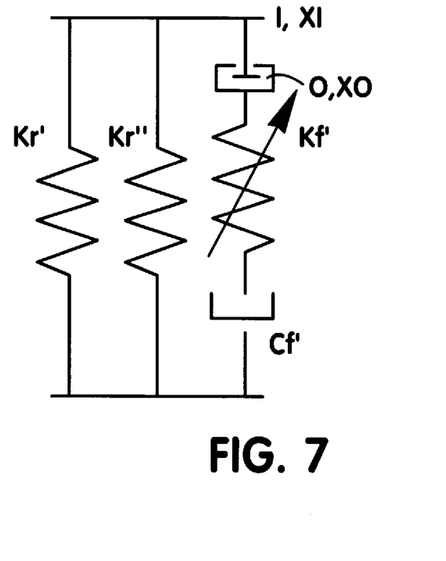
FIG. 7 is a model illustrating the conceptual arrangement of the invention shown in FIG. 6.

A model for the viscous fluid mount 10 shown in FIG. 6 is provided in FIG. 7. The only difference between the model of FIG. 7 and FIG. 5 is that FIG. 7 includes the displacement control device 44 to activate the flow resistance device 36 for high damping when desired. When the cylinder 46 experiences a small displacement $X_j$ at position i the disk 52 produces no displacement at o. Thus, the flow resistance device 36 provides no viscous damping and only structure damping. However, a high input displacement $X_j$ of the mount 46 will cause a displacement $X_o$ of the disk 52 and a displacement $X_o$ of the flow resistance device 36 to produce high viscous damping in addition to structure damping. Accordingly, the viscous mount 10 of FIG. 6 provides high damping at large displacements where system resonance occurs and low damping at small displacements and non-resonance conditions or at high frequencies.

In yet another embodiment of the present invention, as shown in FIG. 8, the viscous mount 10 includes a control unit 54 to allow the viscous fluid mount to operate from low to high damping modes depending upon need. The control unit 54 includes a programmable logic controller 56 of conventional design, an acceleration sensor 58, a pressurized fluid or gas 60, a control valve 62 and a piston and cylinder arrangement 64 of a type well known in the art. The flow resistance device 36 is connected to the piston and cylinder arrangement 64 by the pressurized fluid or gas 60 flowing through a conduit to the control valve 62 which is activated by the controller 56 when resonant conditions are determined by the acceleration sensor 58. The acceleration sensor 58 is mounted on the vibrating body to detect acceleration of the vibrating body in the vertical direction. Upon movement of the vibrating body in the vertical direction an acceleration signal from the sensor 58 is received by the controller 56 which compares the sensed value with a predetermined threshold value and outputs a control signal to the control valve 62 which regulates the flow of pressurized fluid or gas 60 supplied to the cylinder thereby moving the piston and operatively engaging or disengaging the flow resistance device 36. During nonresonant conditions, when high damping is not needed, the flow resistance device 36 is preferably disconnected from the cylinder and piston arrangement 64 and moves independently of the upper cover bracket 14. However, during conditions when high damping is desired, the flow resistance device 36 is engaged by supplying pressure to the cylinder and piston arrangement 64 thereby producing high viscous damping. It will be appreciated that a viscous mount 10 with high damping produces high force transmissibility at nonresonance regions. The control unit 54 activates the flow resistance device 36 for high damping when needed or deactivates the flow resistance device when not needed. The fluid passages 38 of the flow resistance device 36 are restored to a central position within the housing 12 when high damping is not required by resilient members 66 attached to the lower cover bracket 16 and the bottom of the fluid passages 38 and to the upper cover bracket 14 and the top of the fluid passages.

Figure 9:
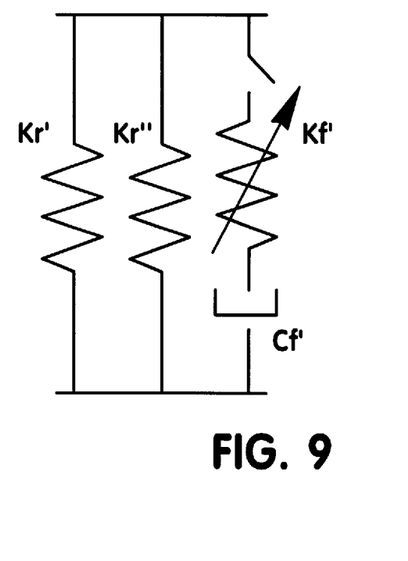
FIG. 9 is a model illustrating the conceptual arrangement of the invention shown in FIG. 8.

A model for the viscous mount 10 of FIG. 8 is shown in FIG. 9. The model includes an elastomeric member, e.g., housing 12, represented by a storage stiffness $K'_r$ in parallel with a loss stiffness $K'_r$ that dissipates energy in terms of structure damping and a flow resistance device 36 including a damping fluid 26. The flow resistance device 36 includes a storage stiffness $K'_f$ in series with a viscous damper $C_f$ that dissipates energy in terms of viscous damping. The storage stiffness $K'_f$ is due to dynamic fluid pressure that is induced by moving fluid against the large cross sectional walls of the fluid passages 38 or high frequency oscillation of the damping fluid 26. A high viscous damper $C_f$ can be generated by a highly viscous damping fluid 26 moving through the large shear interfacial area between the fluid and sidewalls of the fluid passages 38 or high frequency oscillation of the damping fluid.

It will be appreciated that a low storage stiffness $K'_f$ is desirable for vibration isolation of vehicles while a high storage stiffness $K'_f$ is desirable for vehicle handling performance, e.g., cornering. A high viscous damper $C_f$ is desirable at the resonance frequencies of a vehicle. For engine system applications, engine mounts with a high viscous damper $C_f$ reduces the magnitude of vibration at rigid body resonance while a low storage stiffness $K'_f$ isolates vibration at high frequencies of engine systems. For suspension applications, bushings with a high viscous damper $C_f$ damp out vibrations at system resonances and high storage stiffness $K'_f$ provides fast steering response and a firm feeling of handling.

The viscous fluid mount 10 in accordance with the present invention may be assembled by placing the annular rings 24 over the cylindrical projecting member 30 and against the circular base plate 28 of the cover brackets 14 and 16. The upper cover bracket 14 is then aligned with the top of one opening 20 of the housing 12 and the member 30 is inserted within the housing such that the housing sidewall is positioned between the interior surface of the annular ring and the exterior surface of the member 30. The annular rings 24 are formed of a suitable metal that is tightened around the housing against the cylindrical projecting member 30. Next, the flow resistance device 36 is inserted within the housing 12 and filled with damping fluid 26 above the bottom of the cylindrical projecting member of the lower cover bracket 16. The lower cover bracket 16 is then placed over the remaining open end of the housing 12 to seal the housing to form the viscous fluid mount as described above. Because the cylindrical projecting member 30 is of approximately the same diameter of the housing 12 and extends within the housing 12 and into the damping fluid air is purged from the housing without requiring submerged assembly of the viscous fluid mount 10. Fasteners 34, such as bolts and the like, are then inserted through the holes 32 within the cover brackets 14 and 16 to secure the cover brackets to the vibrating body, e.g., engine, and to the base, e.g., chassis as well known in the art.

Figure 10:
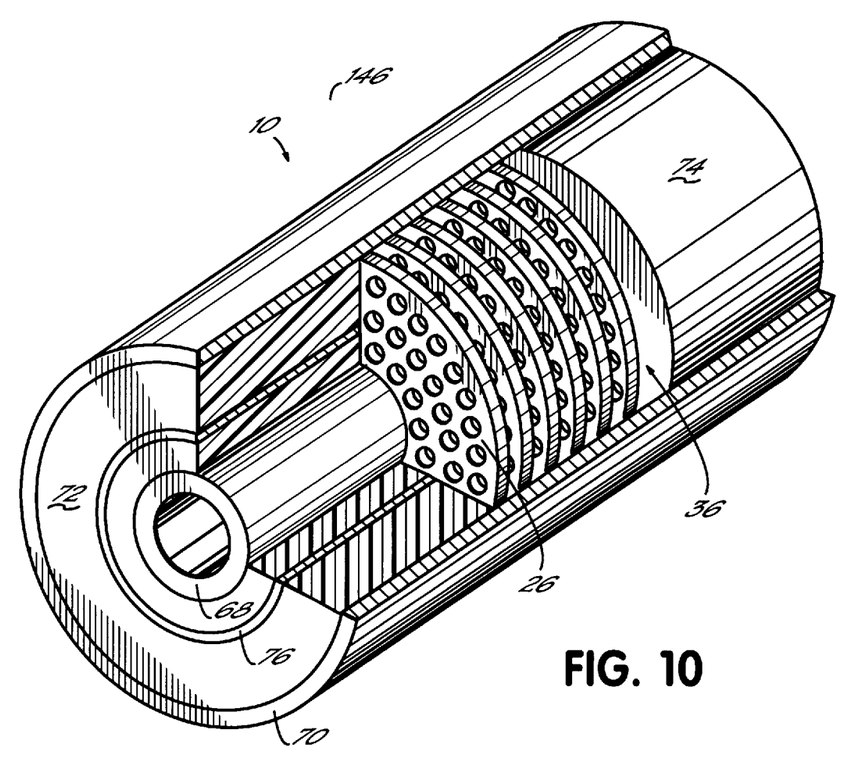
FIG. 10 is a perspective view of yet another embodiment of the present invention.

Another embodiment of a viscous mount 10, as shown in FIG. 10, utilizes inner and outer cylindrical metal sleeves 68 and 70 to house rubber end caps 72 and 74 reinforced with an intermediate metal ring 76. The rubber end caps 72 and 74 define a fluid chamber for the viscous damping fluid 26 and flow resistance device 36 having metal plates with holes. The inner metal sleeve 68 can be attached to the wheel of a vehicle (not shown) and the outer metal 70 can be attached to the vehicle body (not shown). During vibration, the passage of viscous damping fluid 26 through the holes in the metal plates provides damping and the shear motion between the fluid and the plates provides additional damping. The viscous mount 10 shown in FIG. 10 may be applied to suspension control arms or links as well known in the art.

The invention will be further clarified by a consideration of the following example, which is intended to be purely exemplary of the use of the invention.

EXAMPLE

In order to evaluate the performance of a viscous fluid mount in accordance with the present invention, an engine was tested using several different types of mounts. The engine/mount test system used was a 4 cylinder engine from a 1990 Chevrolet Cavalier and included three (3) conventional engine rubber mounts typically supplied by Chevrolet. The dynamic load on the engine/mount test system was created by an electrodynamic shaker, Unholtz-Dickie Model 5PM. Input and output dynamic loads were measured by load cells and motion levels were measured by accelerometers placed near each of the engine mounts on the engine/mount test system. The dynamic characteristics of the engine system, e.g., natural frequencies, were identified from the measured loads and motion levels. The measured natural frequencies and modes of vibration of the engine are provided below in Table 1.

TABLE 1

| MODES OF VIBRATION | NATURAL FREQUENCY (Hz) |
| --- | --- |
| 1 | 7.5 |
| 2 | 8.4 |
| 3 | 11.3 |
| 4 | 12.6 |
| 5 | 15.4 |
| 6 | 19.1 |

The second mode of vibration had a natural frequency of 8.4 Hz and exhibited a very strong vibration in the vertical direction. After system characteristics were identified, the performance of a viscous mount of a type illustrated in FIG. 1, a conventional fluid mount of the single load bearing chamber type and an original equipment type rubber mount manufactured by Yale were evaluated on the engine/mount test system. In each of the tests, only one engine test mount was substituted at a time for the manufacturer supplied engine mount.

Figure 11:
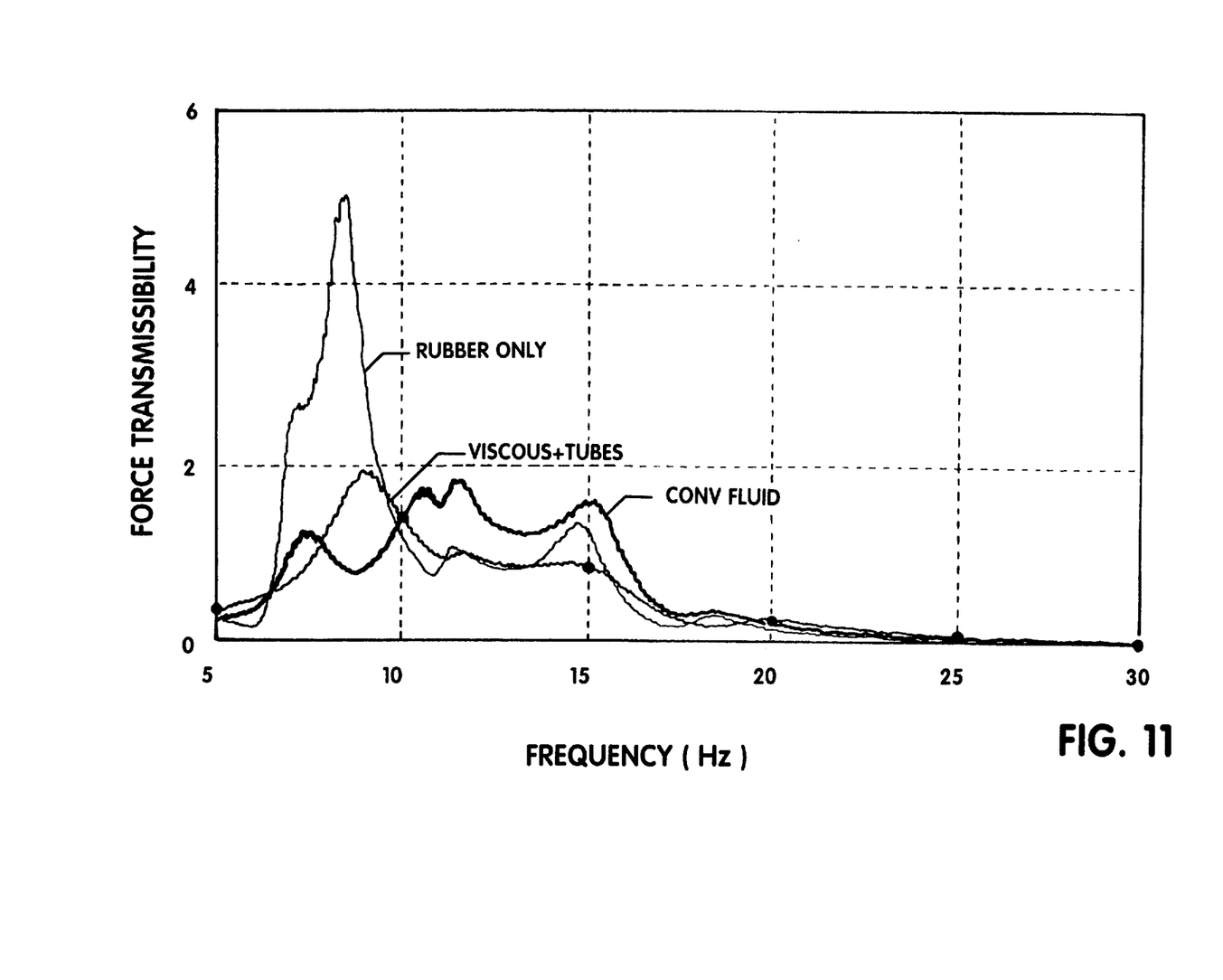
FIG. 11 is a graph showing force transmissibility and frequency of a rubber mount, conventional fluid mount and a fluid mount of the type shown in FIG. 1.

FIG. 11 represents the performance of the viscous mount, conventional fluid mount and rubber mount in terms of transmissibility. As shown in FIG. 11, the rubber mount had the highest transmissibility from approximately 7 to 9 Hz and the fluid mount had the lowest transmissibility because the fluid mount had the highest damping from about 7 to 9 Hz. However, the viscous mount had the lowest transmissibility over the higher and broader range of approximately 11 to 15 Hz because of the relatively high damping and low storage stiffness of the mount. Moreover, the viscous mount in accordance with the present invention had the best overall performance on an engine mount in the range of about 7 to 15 Hz.

Having described presently preferred embodiments of the invention, it is to be understood that it may be otherwise embodied within the scope of the appended claims.

What is claimed is:

1. A viscous fluid mount for interconnection between a vibrating body and a base, said viscous fluid mount comprising:
   a chamber defined by an elastomeric housing having opposing cover brackets, one of said cover brackets adapted to be connected to the vibrating body and another of said cover brackets adapted to be connected to the base;
   a high viscosity damping fluid contained within said chamber; and
   a flow resistance device positioned within said chamber and operatively connected to one of said cover brackets and having a shear stress surface area and a normal stress surface area, said shear stress surface area being greater than said normal stress surface area, such that input energy from the vibrating body is dissipated primarily by shear friction of said damping fluid moving parallel to said shear surface area;
   each said cover bracket including a circular base plate and a boss, said elastomeric housing having internal and external diameters, said base plate having a diameter greater than said housing external diameter, said boss having a diameter approximately equal to said housing internal diameter.

2. The viscous fluid mount of claim 1 wherein said elastomeric housing is generally of a cylindrical shape having a bore extending the longitudinal length thereof member to define a top open end and a bottom open end.

3. The viscous fluid mount of claim 2 wherein said elastomeric housing is formed of rubber.

4. The viscous fluid mount of claim 2 wherein said elastomeric housing is formed of an elastomeric material having a durometer of about 40 to 70 Shore A.

5. The viscous fluid mount of claim 2 wherein said elastomeric housing is formed of an elastomeric material having a durometer of about 60 Shore A.

6. The viscous fluid mount of claim 1 including annular rings positioned around a circumference of said housing to clamp said housing against said boss and form a fluid tight seal.

7. The viscous fluid mount of claim 1 wherein said damping fluid has a viscosity between 70,000 and 120,000 centipoise at ambient temperature.

8. The viscous fluid mount of claim 1 wherein said damping fluid has a viscosity of about 100,000 centipoise at ambient temperature.

9. The viscous fluid mount of claim 1 wherein said damping fluid is selected from silicone oil, grease and liquid crystal polymer.

10. The viscous fluid mount of claim 1 wherein said flow resistance device is a plurality of longitudinally aligned fluid passages.

11. The viscous fluid mount of claim 10 wherein said shear stress surface area of said flow resistance device is at least approximately 100 times greater than said normal stress surface area of said flow resistance device.

12. The viscous fluid mount of claim 10 wherein said shear stress surface area of said flow resistance device is at least 500 times greater than said normal stress surface area of said flow resistance device.

13. The viscous fluid mount of claim 10 wherein said fluid passages are formed by a plurality of stacked plates having axially aligned openings therein, each said plate having an outer diameter less than said elastomeric housing internal diameter to allow said damping fluid to flow around said plates.

14. The viscous fluid mount of claim 1 further comprising a control unit including a controller for controlling said mount operation between low and high damping modes in response to resonant conditions as determined by said controller.

15. The viscous fluid mount of claim 14 wherein said control unit includes a sensor mounted on the vibrating body, said sensor capable of detecting acceleration of the vibrating body in a vertical direction for comparison with a predetermined threshold value by said controller for operatively engaging or disengaging said flow resistance device.

16. The viscous fluid mount of claim 14 wherein during nonresonant conditions said flow resistance device moves independently of said cover bracket.

17. The viscous fluid damping mount of claim 16 further comprising means for restoring said flow resistance device to a central position within said housing when high damping is not required.

\* \* \* \* \*

UNITED STATES PATENT AND TRADEMARK OFFICE
CERTIFICATE OF CORRECTION

PATENT NO. : 5,855,259
DATED : January 5, 1999
INVENTOR(S) : Gin Shy Gau and Jeffry D. Cotton It is certified that error appears in the above-indentified patent and that said Letters Patent is hereby corrected as shown below:

Column 8, line 4, "member" should be deleted.

Signed and Sealed this

Seventeenth Day of August, 1999

Attest:

Attesting Officer

Q. TODD DICKINSON

Acting Commissioner of Patents and Trademarks